(12) United States Patent
Sato et al.

(10) Patent No.: US 7,432,966 B2
(45) Date of Patent: Oct. 7, 2008

(54) IMAGE DATA CORRECTING METHOD AND IMAGING DEVICE

(75) Inventors: Nobuyuki Sato, Tokyo (JP); Ken Nakajima, Tokyo (JP)

(73) Assignee: Sony Corporation, Tokyo (JP)

(*) Notice: Subject to any disclaimer, the term of this patent is extended or adjusted under 35 U.S.C. 154(b) by 1082 days.

(21) Appl. No.: 10/240,778

(22) PCT Filed: Feb. 7, 2002

(86) PCT No.: PCT/JP02/01040

§ 371 (c)(1),
(2), (4) Date: Feb. 24, 2003

(87) PCT Pub. No.: WO02/065760

PCT Pub. Date: Aug. 22, 2002

(65) Prior Publication Data

US 2003/0156204 A1    Aug. 21, 2003

(30) Foreign Application Priority Data

Feb. 7, 2001    (JP) .............................. 2001-031152

(51) Int. Cl.
*H04N 9/64* (2006.01)
*H04N 5/217* (2006.01)
*H04N 5/228* (2006.01)
*H04N 5/225* (2006.01)
*H04N 1/40* (2006.01)

(52) U.S. Cl. .................. 348/251; 348/335; 348/340; 348/222.1; 358/461

(58) Field of Classification Search ................ 348/251, 348/335, 340; 358/461
See application file for complete search history.

(56) References Cited

U.S. PATENT DOCUMENTS 5,047,861 A    9/1991    Houchin et al.

(Continued)

FOREIGN PATENT DOCUMENTS

JP    54-80024    6/1979

(Continued)

*Primary Examiner*—Nhan T Tran
(74) *Attorney, Agent, or Firm*—Frommer Lawrence & Haug LLP; William S. Frommer; Thomas F. Presson

(57) ABSTRACT

A screen correction method and image pick-up device suitable for use in, for example, digital cameras. Horizontal and vertical signals from a signal generator (SG) are supplied to a semiconductor image pick-up device (CCD) via a timing generator (TG). Horizontal and vertical counter values from the signal generator are supplied to a distance calculation block, and the distance from optical axis center position information, provided from terminals 5X, 5Y, is calculated. This calculated distance value d is supplied to a converter (conv), and a distance value, converted according to information from the terminal on the number of pixels of the semiconductor image pick-up device, is supplied to a lookup table (LUT), to output the correction coefficients according to the distance from, for example, the optical axis center position.

16 Claims, 10 Drawing Sheets

U.S. PATENT DOCUMENTS

| | | | |
|---|---|---|---|
| 5,343,302 A * | 8/1994 | Yamashita | 348/251 |
| 5,675,380 A * | 10/1997 | Florent et al. | 348/251 |
| 5,999,278 A | 12/1999 | Suzuki et al. | |
| 6,055,066 A | 4/2000 | Kanda | |
| 6,747,702 B1 * | 6/2004 | Harrigan | 348/335 |
| 6,833,862 B1 * | 12/2004 | Li | 358/461 |
| 6,937,282 B1 * | 8/2005 | Some et al. | 348/335 |
| 6,940,546 B2 * | 9/2005 | Gallagher | 348/224.1 |

FOREIGN PATENT DOCUMENTS

| | | |
|---|---|---|
| JP | 56-64566 | 6/1981 |
| JP | 9-307789 | 11/1997 |
| JP | 09-307789 | * 11/1997 |
| JP | 2000-184247 | 6/2000 |

* cited by examiner

IMAGE DATA CORRECTING METHOD AND IMAGING DEVICE

This application claims a priority benefit to PCT/JP02/01040 filed Feb. 7, 2002, which claims foreign priority to Japan 2001-31152 filed Feb. 7, 2001, which are all incorporated by reference in their entirety herein.

TECHNICAL FIELD

The present invention relates to a screen correction method and image pick-up device suitable for use in, for example, a digital camera. In particular, this invention relates to a screen correction method and image pick-up device which can satisfactorily perform correction of shading and the like caused by peripheral light fall-off due to the lens system, using a single construction even for image pick-up units with different numbers of pixels.

BACKGROUND ART

Generally in image pick-up devices having a lens system and image pick up unit, there is, for example, danger of the occurrence of shading and other impediments in picked-up images caused by peripheral light fall-off due to the lens system. To deal with such impediments, for example, the lens system may be designed using numerous lenses in order to prevent the occurrence of such impediments; but lens systems designed with numerous lenses are expensive, and often cannot readily be used in consumer equipment.

On the other hand, when signals are received according to XY coordinates as, for example, in equipment using semiconductor image pick-up devices, digital processing of the received signals can be used to correct images. Thus in the field of scanners and similar equipment, various proposals have been made of techniques for digital correction of warp, color bleeds, and other lens shading resulting, for example, from image pick-up using inexpensive lenses (Japanese Patent Laid-open No. 11-355511, Japanese Patent Laid-open No. 2000-41183).

However, implementation of these prior arts has been limited to scanners and similar fields in which a substantial amount of time can be used for correction processing, and real-time correction processing like that necessary for digital cameras is not required. On the other hand, techniques for digital correction of lens shading and similar in digital cameras have been proposed, as, for example, disclosed in Japanese Patent Laid-open No. 2000-41179.

It is thought that the above described warp, color bleeds and other lens shading in a device which uses such a lens system for image pick-up will occur as a function of the distance from the optical axis of the lens system. By correcting pixel signals resulting from image pick-up according to this distance, the above-described lens shading can be alleviated or corrected. Hence in order to perform such corrections, first it is necessary to calculate the distance of a pixel for correction from the optical axis of the lens system.

However, when calculating the distance d from the lens optical axis, in the conventional method of distance calculation, the Pythagorean theorem is used to calculate $d=\sqrt{x^2+y^2}$, where the distance on the X-axis between the origin O and the pixel for correction is x, and the distance on the Y-axis is y. However, this calculation method includes calculations of squares and a calculation of the expansion of a root, so that in order to realize this calculation means in hardware, circuitry on an enormous scale is necessary.

A method has also been proposed in which the screen is divided into blocks, as, for example, in FIG. 11, and correction coefficients are set for each block (Japanese Patent Laid-open No. 11-275452). However, in this method the same correction coefficient is used for [all the pixels of] a block, so that the coefficient changes suddenly at the boundaries between blocks, possibly having an adverse effect on image quality. In the attached Figure, the change has been emphasized due to circumstances of the block diagram. In reality, the luminance of the central Figure and of the background changes in step-like fashion at the boundaries of blocks, indicated by solid lines, and these changes are conspicuous.

However, in the above-described method, distances from the lens optical axis and block boundaries are all defined using coordinates; these coordinates are determined by, for example, counting the number of pixels in the image pick-up unit. However, a wide range of numbers of pixels exist in the image pick-up unit, from 100,000 pixels or less to 16,000,000 pixels. When counting the number of pixels as described above and performing corrections based on coordinates, differences in the total number of pixels result in substantial changes in the correction range.

Thus in an image pick-up unit with 790,000 pixels, which is in widespread use, the greatest distance between two arbitrary points is the 1280 pixels of the diagonal line; but in a 12,600,000 pixel image pick-up unit, the maximum distance is 5120 pixels. Consequently a distance calculating means designed for an image pick-up unit with, for example, 790,000 pixels cannot be applied without alteration to a 12,600,000 pixel image pick-up unit; hence circuits must be newly designed according to the number of pixels of the image pick-up unit to be used, thereby increasing the cost of the integrated circuits and other components.

Also, while it is possible to apply a circuit designed for an image pick-up unit with a large number of pixels to an image pick-up unit with a small number of pixels, a circuit designed on the basis of an image pick-up unit with a large number of pixels will, for example, have a large bus width, and when such a circuit is applied to an image pick-up unit with a small number of pixels, redundancy occurs in the circuit. And if, for example, correction coefficients are set to a proportion necessary for an image pick-up unit with a small number of pixels, the number of coefficients set for an image pick-up unit with a large number of pixels becomes huge, and the lookup table or other means of conversion is enormous.

DISCLOSURE OF THE INVENTION

This invention relates to favorably enabling corrections of shading and the like caused by peripheral light fall-off due, for example, to the lens system, using a single construction even for image pick-up units with different numbers of pixels. In this invention, the distance from an arbitrary point to a desired point on the screen is calculated, the calculated distance value is converted according to the number of pixels of the image pick-up unit, and the converted distance value is used to calculate correction coefficients for image correction; herein the screen correction method and image pick-up device of this invention are disclosed.

BRIEF DESCRIPTION OF THE BLOCK DIAGRAMS

BEST MODE FOR CARRYING OUT THE INVENTION

Figure 8A:
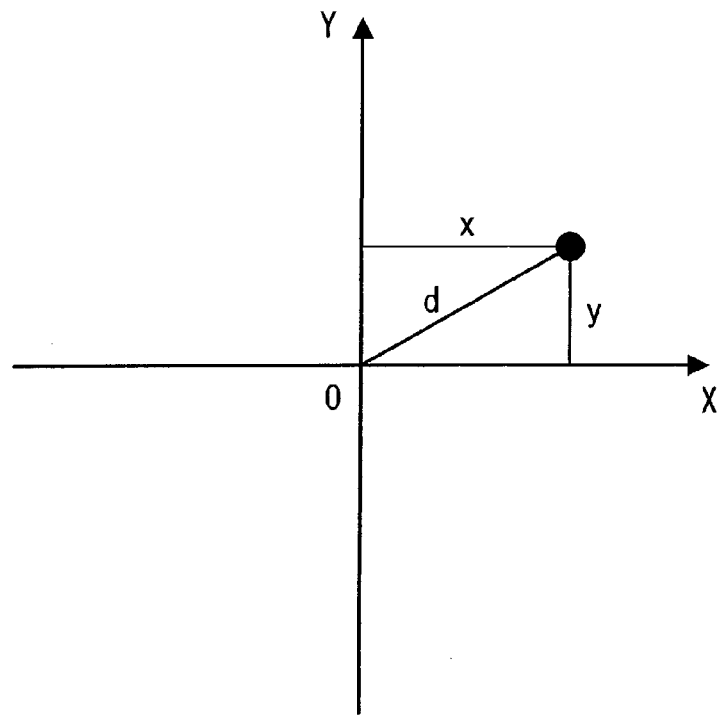
FIG. 8 is a block diagram used to explain a distance calculation method previously proposed by this applicant.
Figure 8B:
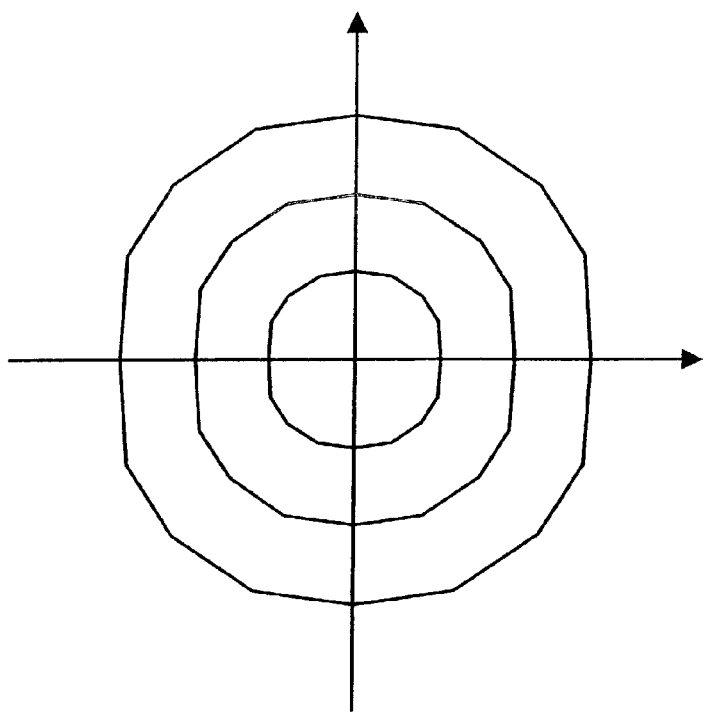
Figure 9:
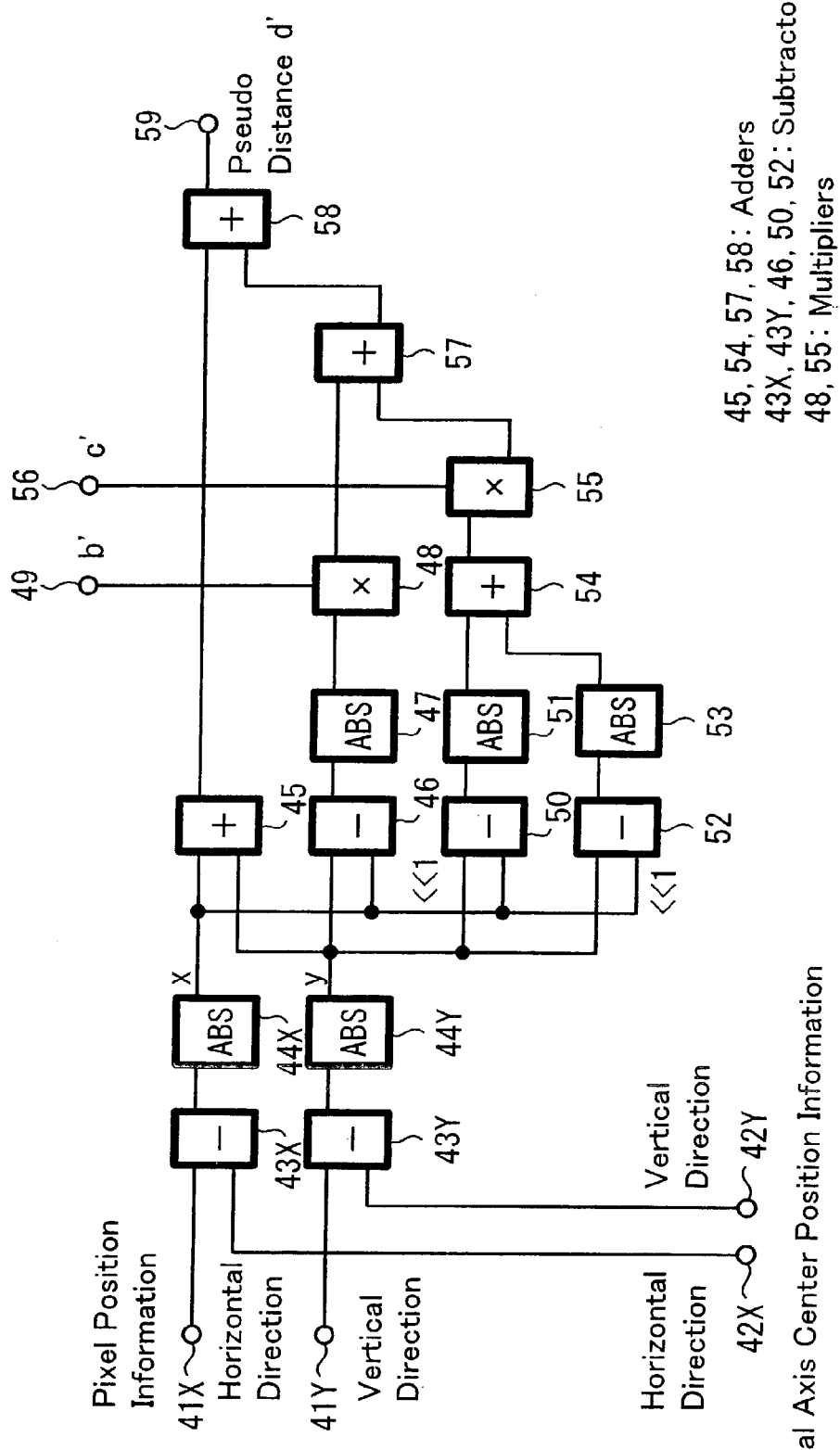
FIG. 9 is a block diagram of a distance calculating means previously proposed by this applicant.
Figure 10:
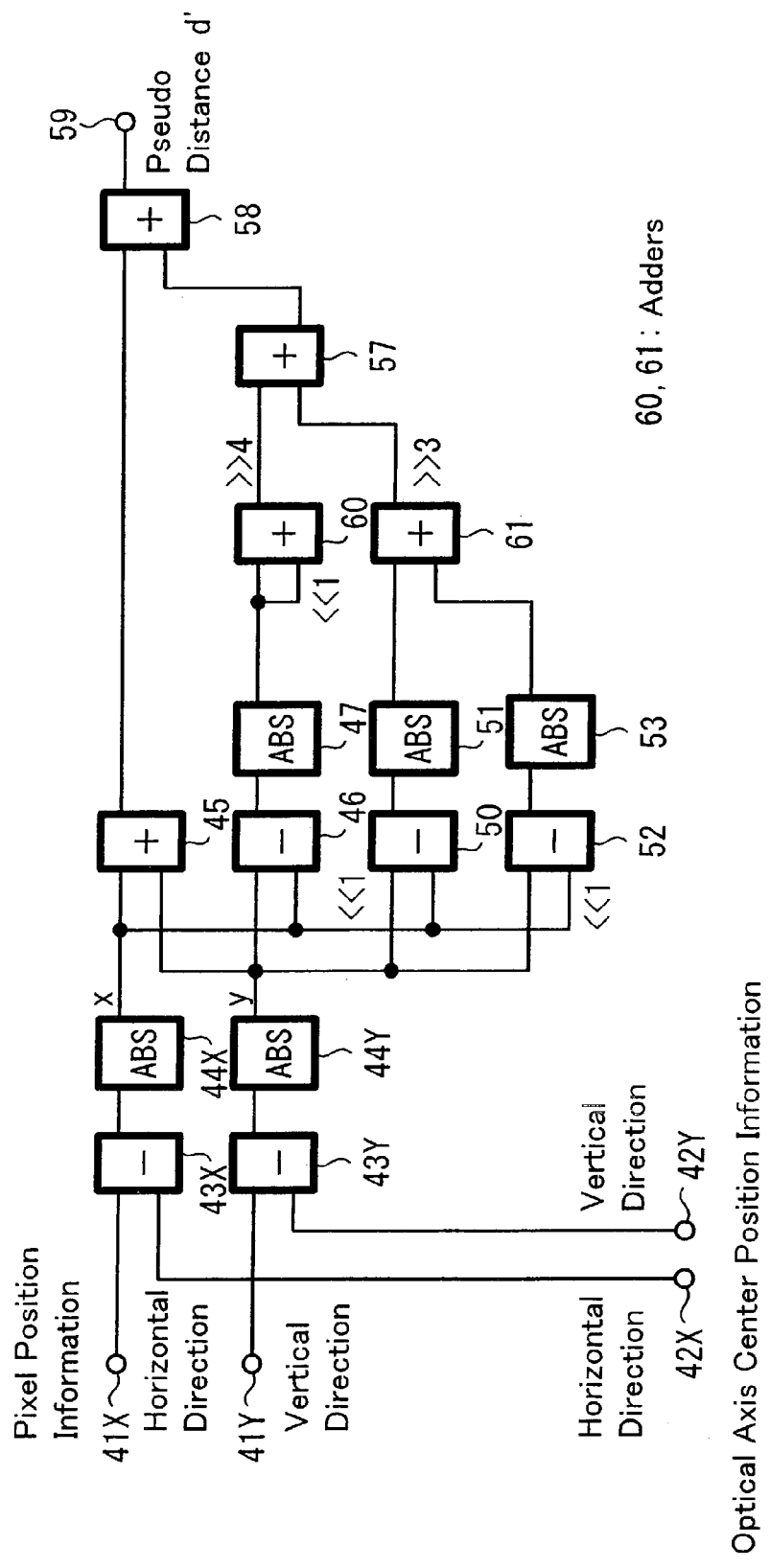
FIG. 10 is another block diagram of the distance calculating means previously proposed by this applicant.
Figure 11:
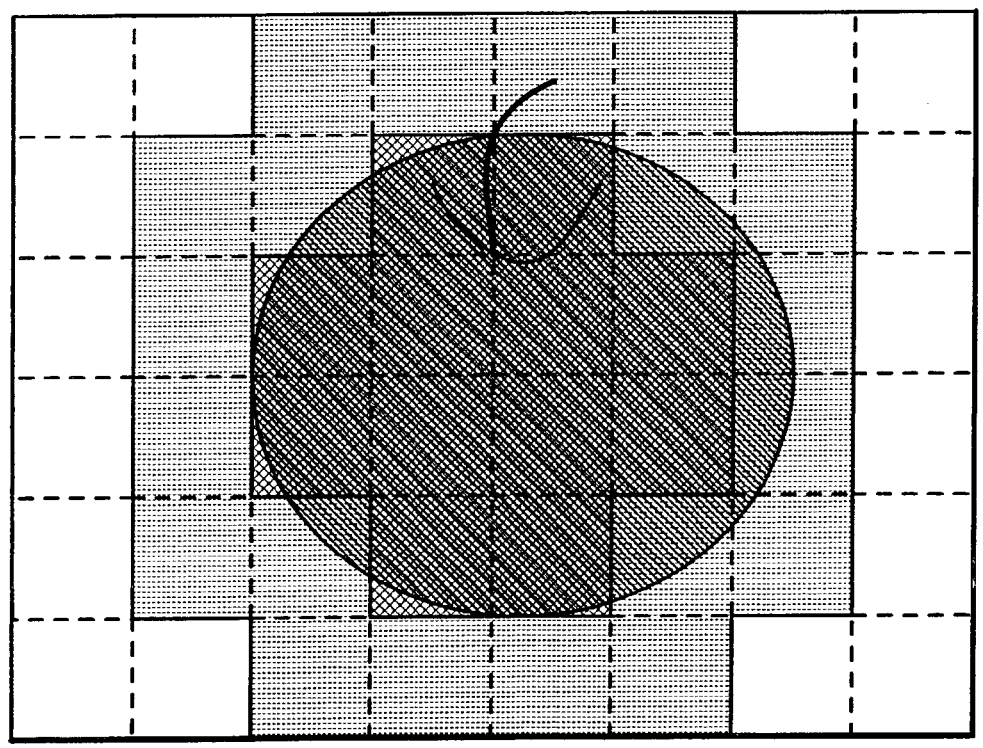
FIG. 11 is a block diagram used to explain a conventional screen correction method.

Prior to explaining this invention referring to the drawings, first FIGS. 8 to 10 are used to explain a distance calculation method proposed by this applicant (Japanese Patent Application No. 2001-14852) for calculation of the distance from the lens optical axis of a pixel for correction using simple hardware.

In this distance calculation method of the previous application, the distance d is to be calculated given that the distances on the X-axis and on the Y-axis between an arbitrary origin O and a desired point are x and y respectively, as shown in A of FIG. 8, and moreover the concentric-circular equidistant curve centered on the origin O is to be calculated by approximating the concentric circle by, for example, a regular 16-sided polygon, as shown in B of FIG. 8. As a result, the formula for the distance d is given by $$d = a(x+y) + b|x-y| + c[|2x-y| + |x-2y|] \quad \text{(eq. 1)}$$

Further, in order that the distances at each of the apex of the regular 16-sided polygon be calculated equally, on solving eq. (1) given the distance d=r for point (r, 0), the distance d=√(2)r for point (r, r), and the distance d=√(5)r for point (r, 2r), the coefficient values become $$a = [\sqrt{5} - 1]/2$$

$$b = [2\sqrt{5} - 3\sqrt{2}]/2$$

$$c = [\sqrt{2} - \sqrt{5} + 1]/2$$

By substituting these coefficient values (a, b, c) and using eq. (1), the distance d for a desired point (x, y), approximated using a regular 16-sided polygon, can be calculated. Here, when calculating the above eq. (1), no calculations of squares or of root expansions are included, so that the calculation procedure can easily be represented as hardware.

FIG. 9 shows the construction of distance calculating means to which the distance calculation method of the previous application is applied. In the circuit of FIG. 9, the distance is calculated assuming d'=d/a:

$$d' = (x+y) + b'|x-y| + c'[|2x-y| + |x-2y|] \quad \text{(eq. 2)}$$

where $$b' = [2\sqrt{5} - 3\sqrt{2}]/[\sqrt{5} - 1]$$

$$c' = [\sqrt{2} - \sqrt{5} + 1]/[\sqrt{5} - 1]$$

The value d' of the pseudo-distance thus computed can be multiplied by a to obtain the distance d; or, if this table is to be used in a lookup table, a table or similar corresponding to pseudo-distance values d' can be prepared in advance.

Information on the position of the desired pixel, that is, the coordinate of the desired pixel position in the horizontal (X-axis) direction and the coordinate in the vertical (Y-axis) direction, are respectively supplied to the terminals 41X, 41Y in FIG. 9. Information on the position of the optical axis center, that is, the coordinate of the optical axis center position in the horizontal (X-axis) direction and the coordinate in the vertical (Y-axis) direction, are respectively supplied to the terminals 42X, 42Y. This position information is supplied to the subtractors 43X, 43Y respectively; the subtracted values are supplied to absolute value (ABS) circuits 44X, 44Y; and the distance x along the X-axis and distance y along the Y-axis between the above arbitrary origin O and the desired point are calculated.

The distance values x and y from these absolute value circuits 44X, 44Y are supplied to the adder 45, and the value of the first term on the right-hand side of the above eq. (2) is calculated. The above distance values x, y are also supplied to the subtractor 46, the subtracted value is supplied to the absolute value (ABS) circuit 47, and the absolute value of the second term on the right-hand side of the above eq. (2) is calculated. This absolute value is supplied to the multiplier 48, and is multiplied by the value b' from the terminal 49, to calculate the value of the second term on the right-hand side of eq. (2).

The above distance value x is shifted one bit upward. The values used in this circuit are binary values, and a shift upward by one bit is equivalent to multiplication by 2. In the figure, a bit shift upward is represented by "<<n" (where n is the number of bits shifted). This distance value x multiplied by 2 is then supplied to the subtractor 50, and the above distance value y is subtracted. The subtracted value is then supplied to an absolute value (ABS) circuit 51, and the first absolute value of the third term on the right-hand side of the above eq. (2) is calculated.

The above distance value x is also supplied to the subtractor 52, and the above distance value y is shifted upward one bit and supplied to the subtractor 52. The distance value y, multiplied by 2, is then subtracted from the distance value x, and the subtracted value is supplied to the absolute value (ABS) circuit 53, to calculate the second absolute value of the third term on the right-hand side of eq. (2). These absolute values are added by the adder 54, and are supplied to the multiplier 55, for multiplication by the value c' from the terminal 56, to calculate the value of the third term on the right-hand side of eq. (2).

The value of the second term on the right-hand side of eq. (2), calculated by the above multiplier 48, and the value of the third term on the right-hand side of eq. (2), calculated by the multiplier 55, are then added by the adder 57, and the result is added to the value of the first term on the right-hand side of eq. (2), calculated by the adder 45, by the adder 58. By this means, the value d' of the pseudo-distance is calculated according to the above eq. (2), and is received from the terminal 59. The distance d can be obtained by multiplying the value d' by a; or, a lookup table corresponding to the value d' of the pseudo-distance, prepared in advance, can be used directly.

In the above FIG. 9, the multipliers 48 and 55 are used for multiplication of the values b' and c'. However, such multipliers cannot be described as promoting a small circuit construction. Hence in the following explanation, a method is indicated in which these multipliers are also eliminated. FIG.

10 shows the construction of distance calculating means which applies the above method, eliminating multipliers. In explaining the construction of FIG. 10, portions which correspond to portions of the above FIG. 9 are assigned the same symbols, and redundant explanations are omitted.

In FIG. 10, the absolute value from the absolute value circuit 47 is supplied to the adder 60, and this absolute value is added to the value obtained by shifting this absolute value upward by one bit (<<1). As a result, an operation is performed in the adder 60 to triple the input value. This added value is then shifted downward four bits, and the result output. Also, the absolute value from the absolute value circuit 51 and the absolute value from the absolute value circuit 53 are supplied to the adder 61, and this added value is shifted downward three bits and output.

The values used in the circuit of FIG. 10 are binary; shifting a value down four bits is equivalent to dividing by 16, and shifting down three bits is equivalent to dividing by 8. In the figure, a bit shift downward is indicated by ">>m" (where m is the number of bits shifted). The values calculated by these adders 60, 61 are then added by the adder 57. Otherwise the construction is similar to that of the above FIG. 9.

In this circuit, processing is performed in the adder 60 to multiply the input value by 3/16. Here the above value b'=(2√(5)−3√(2))/(√(5)−1) is approximately 0.1856656, and is approximated by 3/16=0.1875. In the adder 61, processing is performed to multiply the input value by 2/16. Here the above value c'=(√(2)−√(5)+1)/(√(5)−1) is approximately 0.1441228, and is approximated by 2/16=0.125.

Hence in the distance calculation method of the previous application, a calculation formula approximated using a polygon is employed to calculate distances, and by this means a simple hardware construction can be used to satisfactorily calculate distances. And by means of the circuit of FIG. 10, multiplication by the values b' and c' can be performed merely by addition and bit-shifting, without using a multiplier, so that the circuit construction can be made simpler still.

invention is explained; however, it is self-evident that this invention can be executed even when another distance calculation method is employed.

Figure 1:
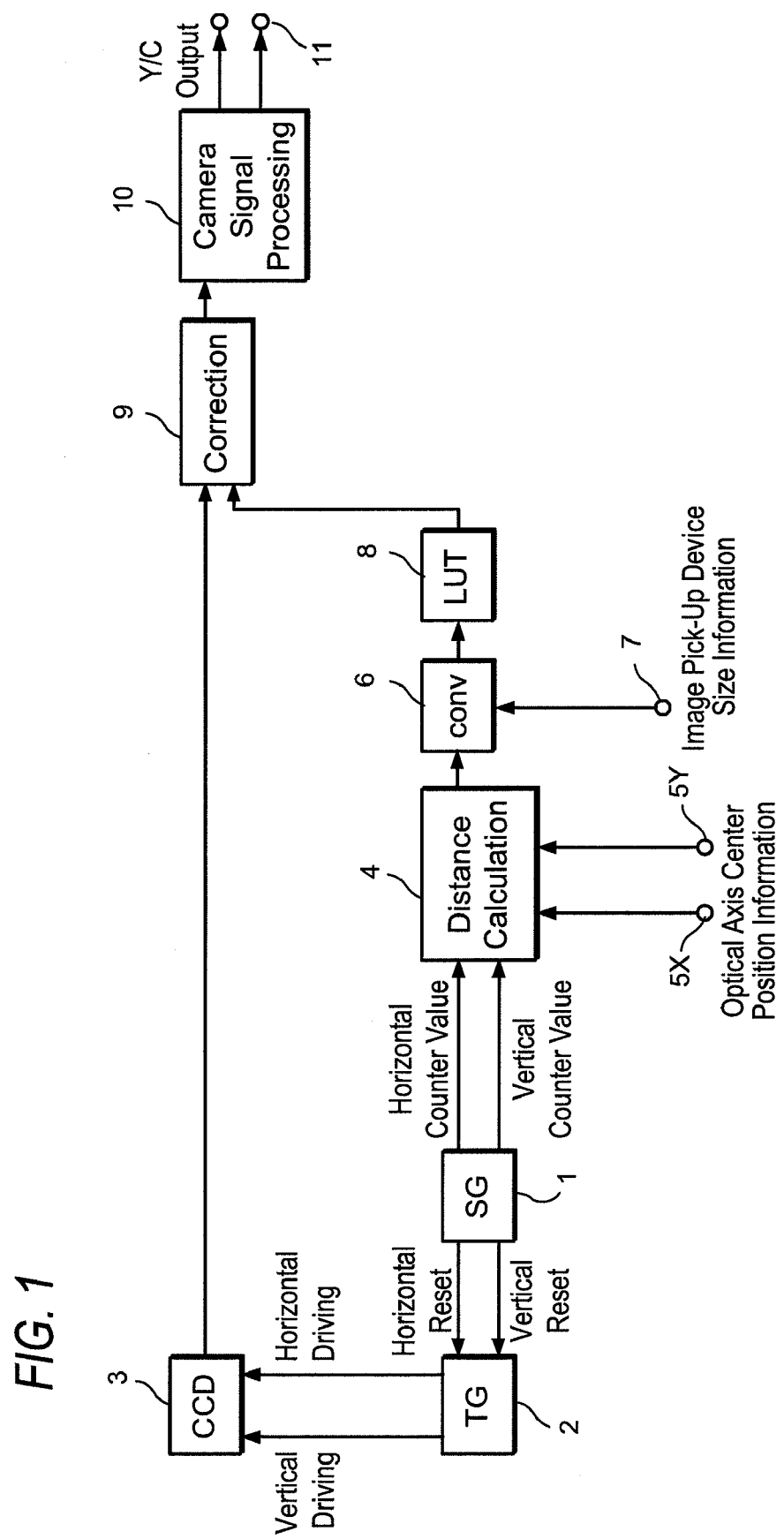
FIG. 1 is a block diagram of an embodiment of an image pick-up device to which this invention is applied.

FIG. 1 shows the construction of a digital camera signal processing [system] provided with functions for correction of peripheral light fall-off and similar in real-time. In FIG. 1, a horizontal reset signal and vertical reset signal from a signal generator (SG) 1 are supplied to a timing generator (TG), and the horizontal driving signal and vertical driving signal generated by the timing generator 2 are supplied to the semiconductor image pick-up device (CCD) 3; the signals for each pixel of a picked-up image are read out according to the horizontal driving signals and vertical driving signals from the timing generator 2.

The horizontal count value and vertical count value from the signal generator 1 are supplied to the distance calculation block 4. Together with this, optical axis center position information from the terminals X, Y is supplied to the distance calculation block 4, and the distance from an arbitrary point (the optical axis center position) to a desired point on the screen is calculated. That is, for each pixel read from the semiconductor image pick-up device 3, horizontal count values and vertical count values corresponding to the pixel are supplied by the signal generator 1 to the distance calculation block 4, and the distance from the optical axis center position is calculated.

In other words, in this distance calculation block 4, the above-described distance calculation method of the previous application is used to calculate the value d of the distance from the optical axis center position. The value d of the distance received from this distance calculation block 4 is then supplied to a converter (conv). In addition, a data signal indicating the number of pixels of the semiconductor image pick-up device 3 is supplied to the converter 6 from, for example, the terminal 7. In this way, conversions such as shown in Table 1 below, for example, are performed by the converter 6.

| Screen Size | | Approximate Total Number of Pixels | Maximum Distance in Number of Pixels | Converted Value Multiplier | Number of Bits Shifted | Number of Correction Coefficients |
|---|---|---|---|---|---|---|
| Horizontal | Vertical | | | | | |
| 1024 | 768 | 79 ten thousands | 1280 | ×4 | <<2 | 32 |
| 1280 | 960 | 123 ten thousands | 1600 | ×3.2 | <<2 | 40 |
| 1600 | 1200 | 192 ten thousands | 2000 | ×2.56 | <<2 | 50 |
| 2048 | 1536 | 314 ten thousands | 2560 | ×2 | <<1 | 32 |
| 2560 | 1920 | 490 ten thousands | 3200 | ×1.6 | <<1 | 40 |
| 3200 | 2400 | 768 ten thousands | 4000 | ×1.28 | <<1 | 50 |
| 4046 | 3072 | 1260 ten thousands | 5120 | ×1 | 0 | 32 |

FIG. 1 shows the construction of an embodiment of an image pick-up device to which the screen correction method and image pick-up device of this invention have been applied. Below, the case in which the above-described distance calculation method of the previous application is applied to the screen correction method and image pick-up device of this In other words, Table 1 are provided calculations of the number of pixels forming the maximum distances (diagonal lines) for each of seven types of semiconductor image pick-up devices, the number of pixels of which range from 790,000 pixels to 12,600,000 pixels. For each of these maximum distance numbers of pixels, a value (multiplier) to convert the distances of other semiconductor image pick-up devices, based on, for example, the semiconductor image pick-up device with a maximum of 12,600,000 pixels, is calculated. These multipliers are used to perform conversions in the converter 6 of the distance value d received from the above-described distance calculation block 4. This conversion is performed by supplying the above-described multiplier to, for example, the terminal 7.

The distance value converted by the converter 6 is supplied to a lookup table (LUT) 8; in this lookup table 8 are provided correction coefficients to correct peripheral light fall-off according to the distance from, for example, the optical axis center position, and a correction coefficient corresponding to the supplied distance value is output. As the correction coefficients, it was confirmed through experiments that if, for example, 32 discrete values are provided for the entire screen, regardless of the number of pixels of the semiconductor image pick-up device, and if linear interpolation is performed using polygonal lines between these discrete values, changes in images due to changes in the correction coefficient are smooth and do not become unnatural.

Figure 2:
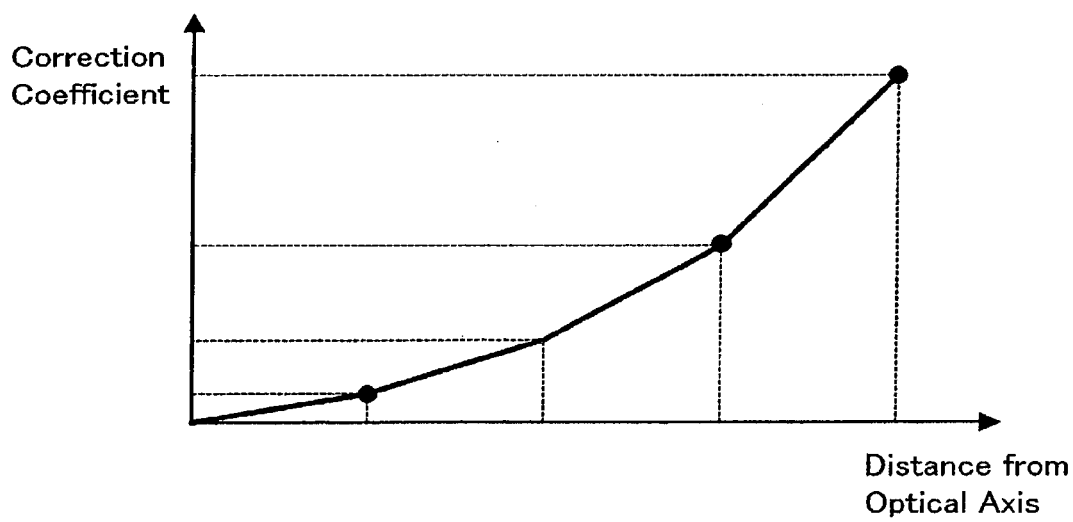
FIG. 2 is a graph for explaining the same.

For the above-described semiconductor image pick-up device with 12,600,000 pixels, the 5120 pixels forming the diagonal line can, for example, be divided equally into 32 parts to obtain discrete values of 160 pixels each, and using polygonal lines between the discrete values, correction coefficients can be calculated for all distances d by, for example, performing linear interpolation as shown in FIG. 2. And for semiconductor image pick-up devices other than the above-described element with 12,600,000 pixels also, by using the above-described converter 6 to convert distance values through multiplication by the multipliers shown in, for example, Table 1, correction coefficients can be calculated in exactly the same manner.

In other words, for example in the case of a semiconductor image pick-up device with 790,000 pixels, by performing a conversion in which the distance value d is multiplied by the value 4, the 40 pixels obtained by dividing into 32 equal portions the 1280 pixels forming the diagonal line are converted into 160 pixels, and using discrete values provided for each 160 pixels, and performing linear interpolation using polygonal lines between these discrete values, correction coefficients can be calculated for all distance values d in a manner entirely similar to that described above for a semiconductor image pick-up device with 12,600,000 pixels. And, correction coefficients can be calculated in an entirely similar manner for other semiconductor image pick-up devices as well.

Correction coefficients corresponding to the above distance values d are output from the above-described lookup table 8. These correction coefficients are provided to a correction block 9, and the signals for each of the pixels read from the semiconductor image pick-up device 3 are corrected against peripheral light fall-off and similar according to the distance from the optical axis center position. This correction block 9 generally comprises a multiplier which performs multiplication by correction coefficients; however, when an offset is to be added in performing corrections, an adder may also be provided. Also, circuits which perform corrections of other than peripheral light fall-off, such as, for example, color bleeds, may also be provided.

Signals corrected by the correction block 9 are provided to the camera signal processing block 10, where, for example, interpolation and synchronization processing of the provided image signals are performed, and an output image signal (Y/C output signal) is formed for output from the terminal 11. In this way, corrections of peripheral light fall-off and the like are performed according to the distance from, for example, the optical axis center position, for the signals of each pixel captured by a semiconductor image pick-up device 3. And, the same circuit can be used for this correction, regardless of the number of pixels of the semiconductor image pick-up device.

In the above embodiments, the discrete values of the correction coefficients provided in the lookup table are determined by measurement or other means according to the characteristics of the lens system used; but the construction of the other portions is the same, regardless of the number of pixels of the image pick-up unit or other differences. And, because the number of discrete values of the correction coefficients provided in the lookup table is the same, a single construction can be applied to all devices.

Hence in this embodiment, distance values from an arbitrary point are calculated for a desired point on the screen, and the calculated distance values are converted according to the number of pixels of the image pick-up unit; by using the converted distance values to determine correction coefficients for screen correction, the same circuit can be used to accommodate image pick-up units with different numbers of pixels, so that there is no need to design new circuits or other components, and in addition the problems of circuit redundancy and of a huge number of correction coefficients can also be resolved.

Thus by means of this invention, it is easy to eliminate problems which could not be resolved in conventional devices, such as increases in the costs of integrated circuits and similar due to new designs of circuits according to the number of pixels of the image pick-up unit used, or the occurrence of redundant circuitry, a vast number of correction coefficients, and a huge lookup tables for use in conversion, as a result of, for example, application of a circuit designed for an image pick-up unit with a large number of pixels to an image pick-up unit with a small number of pixels.

In the above aspect, values (multipliers) for conversion of the distances for other semiconductor image pick-up devices were determined based on a semiconductor image pick-up device with 12,600,000 pixels. Also, in the above embodiment multiplication was performed by the converter 6; however, conversions can be based on a semiconductor image pick-up device with a small number of pixels, with the converter 6 performing divisions to convert the distances of other semiconductor image pick-up devices. However, in general the construction of a divider is more complex than that of a multiplier, so that the circuit scale may be increased.

Figure 3A:
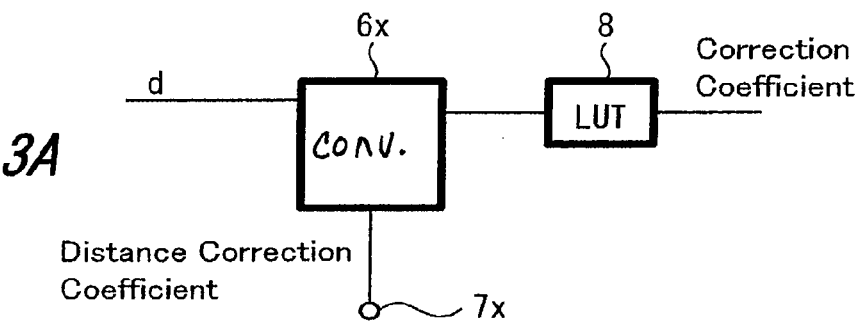
FIG. 3 are block diagrams of two aspects of principal parts of an image pick-up device to which this invention is applied.
Figure 3B:
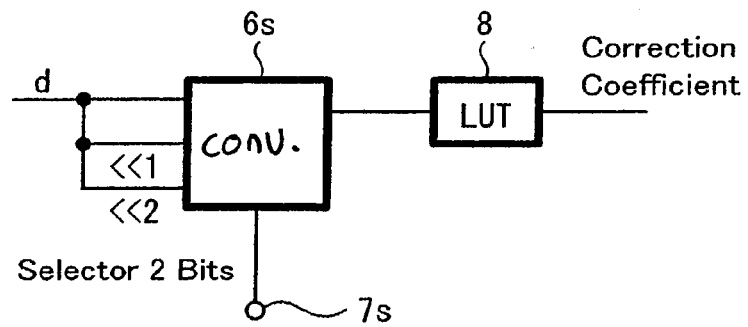

In the above embodiment, the converter 6 performing conversion of the distance value d is comprised of a multiplier $6x$ such as shown in A of FIG. 3, and the above-described multiplier is supplied from the terminal $7x$ as a distance correction coefficient; however, as shown in B of FIG. 3, the distance value d, the value obtained by shifting the distance value d one bit down (<<1), and the value obtained by shifting two bits down (<<2), may be supplied to the selector $6s$, and selection from these values performed using a two-bit selector signal supplied from the terminal $7s$. By this means, a comparatively complicated multiplier can be replaced by a simple selector.

In this case, conversion by means of bit-shifting is performed, as indicated by the second column from the right in Table 1, for seven types of semiconductor image pick-up devices, with from 790,000 pixels to 12,600,000 pixels. That is, by for example shifting two bits upward (<<2) with respect to the 790,000-pixel semiconductor image pick-up device, conversion to multiply by 4 is performed. And for a 3,140,000-pixel semiconductor image pick-up device also, by shifting upward by one bit (<<1), conversion to multiply by 2 is performed. In this way, conversions similar to those performed by a multiplier can be performed for various semiconductor image pick-up devices.

In the above Table 1, whereas ordinarily a conversion would be performed [multiplying by] 3.2 and 2.56 for semiconductor image pick-up devices having 1,230,000 pixels and 1,920,000 pixels respectively, conversion is performed by shifting two bits upward (<<2), to multiply by 4. And for semiconductor image pick-up devices with 4,900,000 pixels and 7,680,000 pixels, whereas normally conversion would be performed by multiplying by 1.6 and by 1.28, here conversion is performed by shifting one bit upward (<<1), to multiply by 2. Hence in these cases, the number of pixels in the converted maximum distances is greater than that for 12,600,000 pixels.

In other words, in the cases of the above 1,230,000 pixels and 4,900,000 pixels, the maximum distance is 6400 pixels. In the cases of 1,920,000 pixels and 7,680,000 pixels, the maximum distance is 8000 pixels. In all cases, the maximum distance is greater than the 5120 pixels for a 12,600,000-pixel image pick-up device. However, it is possible to provide correction coefficients at every distance of 160 pixels, similarly to the case described above, even for each of these converted distances; in this case, 40 correction coefficients are provided for 6400 pixels and 50 are provided for 8000 pixels, as shown in the rightmost column of Table 1.

In the above embodiment, for example 64 correction coefficient areas are provided in advance in the lookup table 8, so that even when the distances for the above-described 1,920,000 pixels and 7,680,000 pixels are converted by shifting by two bits and by one bit, 50 correction coefficients are provided, and from these correction coefficients, linear interpolation can be performed using polygonal lines between discrete values. To the extent that the number of correction coefficients is greater than 32, more precise corrections are performed, and so no problems arise. Also, if conversions are performed using bit-shifting, there is no need for more than 64 correction coefficients.

Thus by using the above bit-shifting and selector in this embodiment, comparatively complicated multipliers can be replaced by a simple circuit construction. Also, in this case the size of the lookup table can be held within a prescribed range, so that the circuit construction of the overall device can be greatly simplified. And, when using bit-shifting and a selector, division calculations can also be performed easily, so that semiconductor image pick-up devices with greater numbers of pixels can also be easily accommodated.

Figure 4:
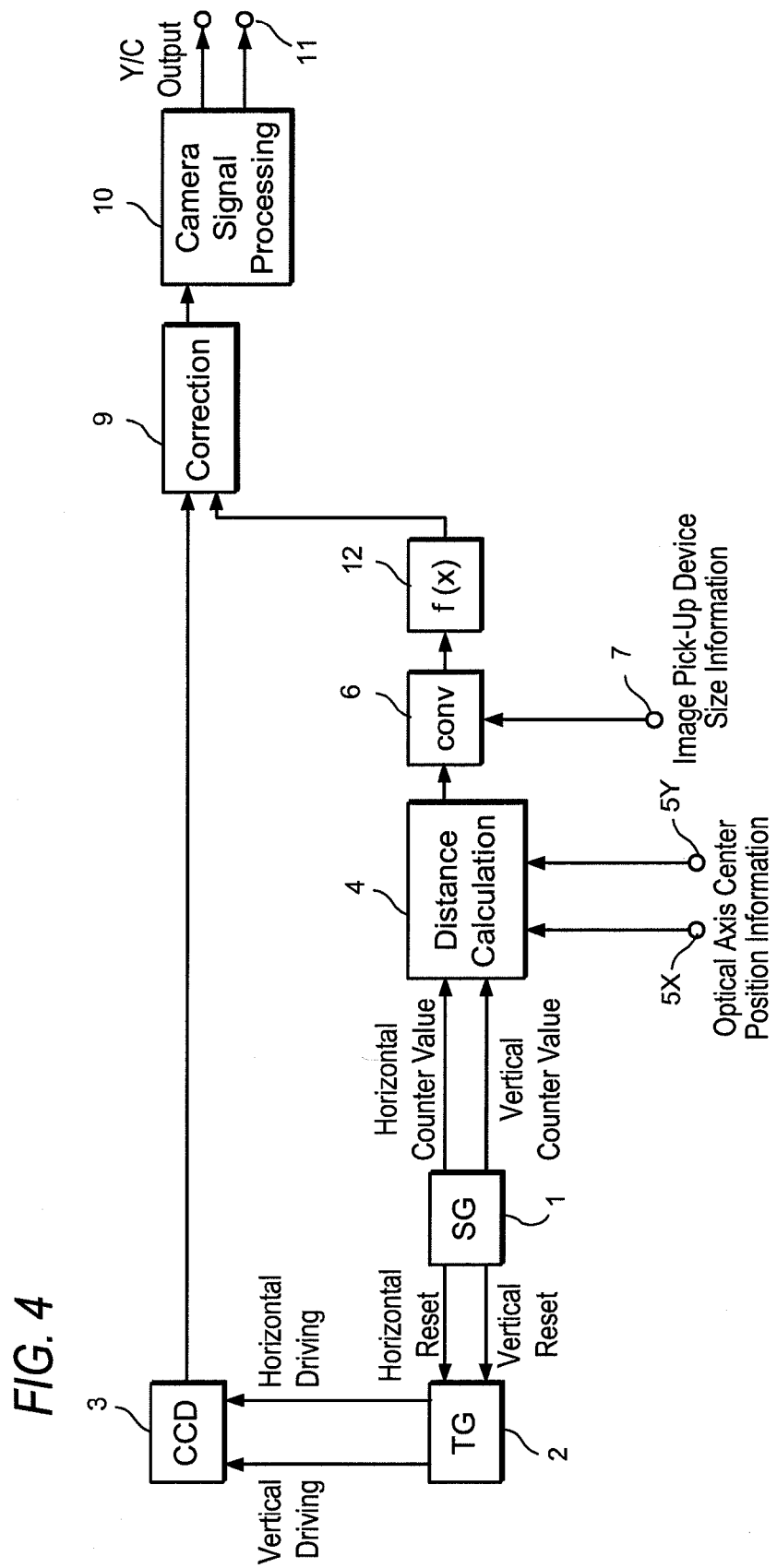
FIG. 4 is a block diagram of another embodiment of an image pick-up device to which this invention is applied.

In the above embodiment, the lookup table 8 can use a construction in which correction coefficients for correction of peripheral light fall-off or similar are calculated for a given distance from, for example, the optical axis center position. FIG. 4 shows the construction in this case; in FIG. 4, in place of the above-described lookup table 8, a block 12 for calculation of a correction function f(d) is provided. By this means also, satisfactory corrections of lens shading and others can be performed using calculated distance values, and in addition, by using a converter 6 which converts distance values d, the circuit construction can be simplified.

Figure 5:
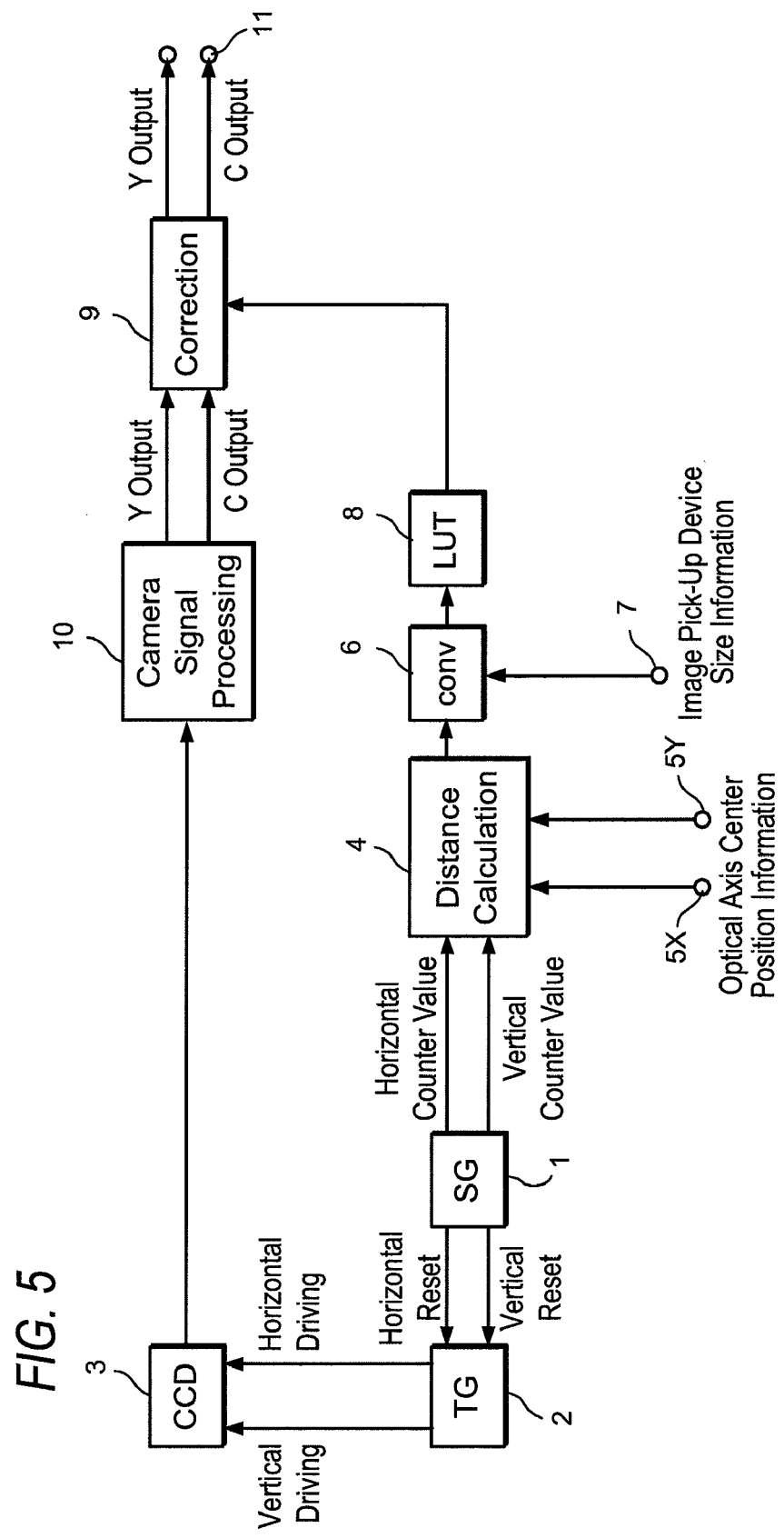
FIG. 5 is a block diagram of further another embodiment of an image pick-up device to which this invention is applied.

In the above embodiment, the correction block 9 can be provided after the camera signal processing block 10 to perform conversions, as shown in FIG. 5. Hence in this case, corrections are performed after the luminance signal (Y signal) and color-difference signals (Cb, Cr signals) have been separated, so that corrections can be performed independently for the luminance signals and the color-difference signals, correction of peripheral light fall-off for the luminance signals and color bleeds for the color-difference signals, for example.

Figure 6:
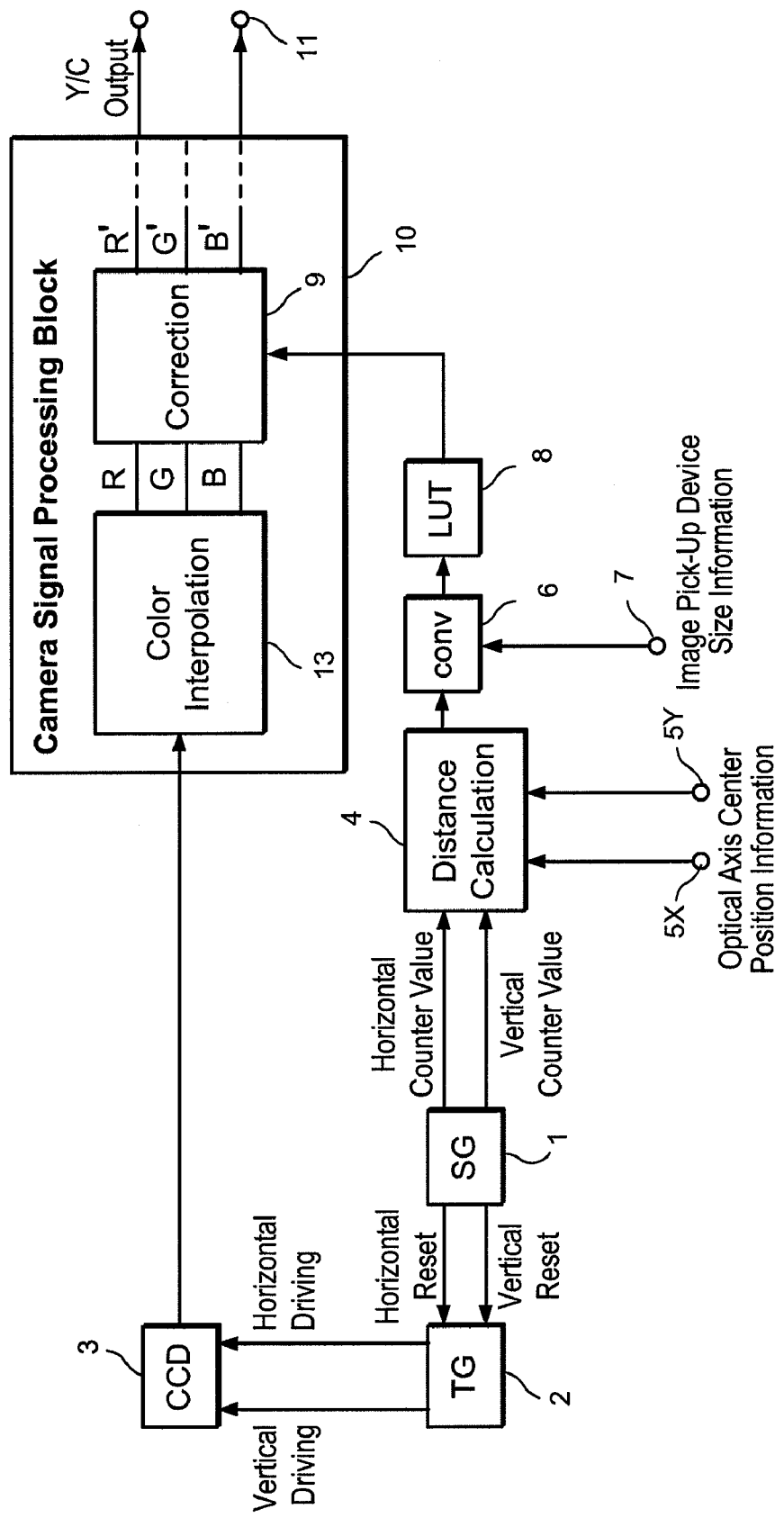
FIG. 6 is a block diagram of yet further another embodiment of an image pick-up device to which this invention is applied.
Figure 7:
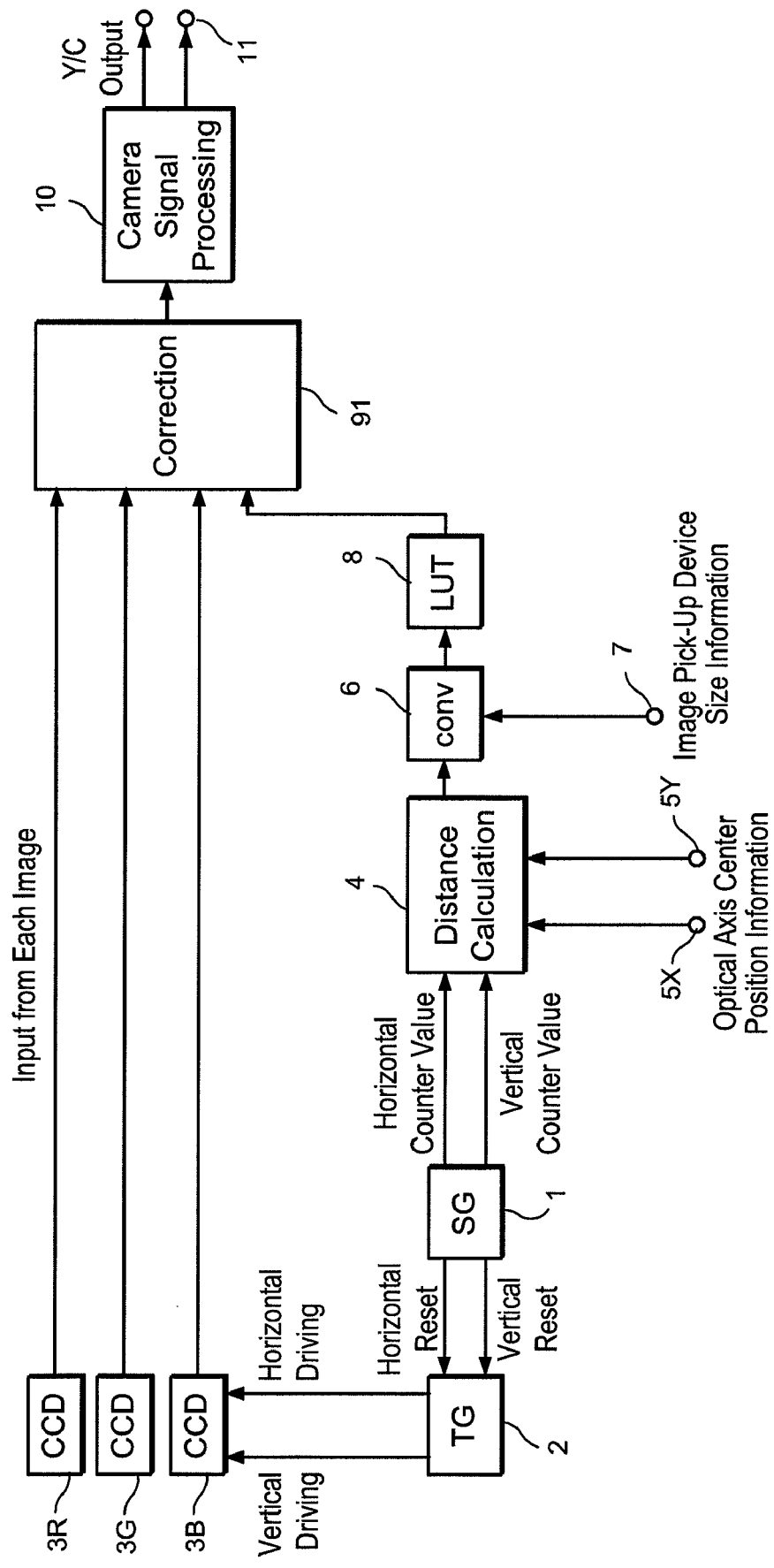
FIG. 7 is a block diagram of another embodiment of an image pick-up device to which this invention is applied.

The correction block 9 may be provided after the color interpolation processing block 13 within the camera signal processing block 10 as shown in FIG. 6, so that when the three color signals (R, G, B) are prepared by interpolation for all pixels, lens shading correction is performed. And in a device in which a plurality of image pick-up devices are provided as, for example, shown in FIG. 7, a correction block 91 may be provided to execute correction for each image pick-up device 3R, 3G, 3B.

In the above embodiment, the lookup table is represented as a single block in all cases; however, the lookup table 8 may be such as to record values for the three colors (R, G, B) and for the luminance signal (Y signal) and color-difference signals (Cb, Cr signals) as well.

An image pick-up device of this invention is in general applied to a digital still camera which photographs still images; but application to digital video cameras which capture moving images is also possible, exploiting the feature of enabling distance calculations in real-time.

Thus by means of the above-described screen correction method, the distance of a desired point on the screen from an arbitrary point is calculated, and screen corrections are performed based on the calculated distance value; distance values are converted according to the number of pixels of the image pick-up unit used to capture the screen image, and using the converted distance value, correction coefficients for screen correction are determined. Thus a simple hardware construction can be used to perform distance calculations and correct lens shading, and the same circuit can be used to accommodate image pick-up devices with different numbers of pixels, so that problems of circuit redundancy and similar can be avoided.

The above image pick-up device is an image pick-up device having a lens system and an image pick-up unit from which signals are output according to XY coordinates. [The image pick-up device] has calculation means to calculate the distance of a desired point from a point corresponding to the optical axis upon input of the XY coordinates of the point corresponding to the lens system optical axis and the XY coordinates of the desired point; conversion means to convert a calculated distance value according to the number of pixels of the image pick-up unit; correction coefficient formation means to determine the correction coefficient for screen correction, using the converted distance value; and screen correction means to perform correction of the screen using the correction coefficients. As a result, a simple hardware construction can be used to perform satisfactory corrections of lens shading and others, and in addition the same circuit can be used to accommodate image pick-up units with different numbers of pixels, as well as eliminating problems of circuit redundancy.

This invention is not limited to the embodiment explained above, but can be modified in various ways which do not deviate from the essence of the invention.

Thus according to this invention, the distance value from an arbitrary point to a desired point on the screen is calculated, and the calculated distance value is converted according to the number of pixels of the image pick-up unit; by using this converted distance value to determine the correction coefficients for screen correction, a simple hardware construction can be employed to calculate distances and perform corrections of lens shading and others, and in addition the same circuit can be used to accommodate image pick-up units with different numbers of pixels, thus avoiding circuit redundancy and eliminating the possibility of vast increases in the number of correction coefficients.

Further, according to this invention the correction coefficients are determined by providing a prescribed number of discrete values, regardless of the number of pixels of the above image pick-up unit, and using polygonal lines to perform interpolation between the discrete values, so that a simple hardware construction can be used to perform satisfactory corrections of lens shading and others.

According to this invention, by providing 32 or more discrete values of correction coefficients, a simple hardware construction can be used to perform corrections of lens shading and others with no unnaturalness.

According to this invention, conversion of distance values is performed by dividing the number of pixels of the above image pick-up unit into arbitrary ranges, and multiplying by a prescribed value for each range, so that an extremely simple hardware construction can be used to perform satisfactory corrections of lens shading and others.

According to this invention, multiplication by prescribed values is performed by bit-shifting of binary values, so that a simpler hardware construction can be used to perform satisfactory corrections of lens shading and others.

Also according to this invention, in an image pick-up device having a lens system and an image pick-up unit from which signals are output according to XY coordinates, distance values are calculated from an arbitrary point to a desired point on the screen, the calculated distance values are converted according to the number of pixels of the image pick-up unit, and the converted distance values are used to determine correction coefficients for screen correction; by this means, a simple hardware construction can be used to perform satisfactory corrections of lens shading and others, and in addition the same circuit can be used to accommodate image pick-up units with different numbers of pixels, so that circuit redundancy and other problems can be avoided.

According to this invention, a prescribed number of discrete values are provided, regardless of the number of pixels of the above image pick-up unit, and polygonal lines between discrete values are used to perform linear interpolation to calculate correction coefficients; by this means, a simple hardware construction can be used to perform satisfactory corrections of lens shading and others.

According to this invention, by setting the number of discrete values for correction coefficients at 32 or more, a simple hardware construction can be used to perform satisfactory corrections of lens shading and others with no unnaturalness.

According to this invention, distance values are converted by dividing the number of pixels of the above image pick-up unit into arbitrary ranges, and multiplying by a prescribed value for each division, so that an extremely simple hardware construction can be used to perform satisfactory corrections of lens shading and others.

According to this invention, by using binary-value bit-shifting to perform multiplication by prescribed values, a simpler hardware construction can be used to perform satisfactory corrections of lens shading and others.

Thus whereas in conventional methods and devices an extensive circuit construction is necessary in order to represent distance calculating means in hardware, and distances cannot be calculated with high precision using a simplified circuit construction, while distances from the optical axis cannot be accurately determined when the size of the image pick-up unit is changed, or sampling or other readout methods are changed, by means of the present invention these problems can easily be eliminated.

The invention claimed is:

1. An image data correction method, comprising:
    calculating a distance value from an arbitrary point to a desired point on a screen;
    performing correction of image data based on said calculated distance value;
    converting a plurality of calculated distance values according to a number of pixels used to capture an image of said screen;
    determining correction coefficients for correction of said image data using said converted distance values;
    setting correction coefficients corresponding to a predetermined number of said converted distance values to a prescribed number of discrete values, regardless of the number of pixels used to capture the image data of said screen; and
    calculating said converted distance values, that are not included in said predetermined converted distance values, by linear interpolation using polygonal lines between said discrete values.

2. The image data correction method according to claim 1, wherein said prescribed number of discrete values is 32 or greater.

3. The image data correction method according to claim 1, wherein said distance value conversion is performed by dividing the number of pixels into arbitrary ranges, and multiplying each of said ranges by a prescribed value.

4. The image data correction method according to claim 3, wherein said multiplication by prescribed values is performed by bit-shifting of binary values.

5. An image pick-up device, comprising:
    a lens system;
    an image pick-up unit that outputs signals according to XY coordinates;
    calculation means for, upon input of the XY coordinates of a point corresponding to an optical axis of said lens system and the XY coordinates of a desired point, calculating a distance value between the point corresponding to said optical axis and said desired point;
    conversion means for converting a plurality of calculated distance values according to a number of pixels of said image pick-up unit;
    correction coefficient formation means for determining correction coefficients for image data correction using said converted distance values; and,
    image data correction means for performing image data correction using said correction coefficients;
    wherein said correction coefficients corresponding to a predetermined number of the converted distance values are set to a prescribed number of discrete values, regardless of the number of pixels of said image pick-up unit, and said converted distance values are calculated by linear interpolation using polygonal lines between said discrete values.

6. The device according to claim 5 wherein, said prescribed number of discrete values is 32 or greater.

7. The device according to claim 5, wherein said conversion means divides the number of pixels of said image pick-up unit into arbitrary ranges, and multiples each of said ranges by a prescribed value.

8. The device according to claim 7, wherein said multiplication by prescribed values is performed by bit-shifting of binary values.

9. An image data correction method, comprising:
    calculating a distance value from an arbitrary point to a desired point on a screen;

performing correction of image data based on said calculated distance value;

converting a plurality of calculated distance values according to a number of pixels used to capture an image of said screen;

determining correction coefficients for correction of said image data using said converted distance values;

setting correction coefficients corresponding to a predetermined number of said converted distance values to a prescribed number of discrete values; and calculating said converted distance values, that are not included in said predetermined converted distance values, by linear interpolation using polygonal lines between said discrete values.

10. The image data correction method according to claim 9, wherein said number of discrete values is at least 32.

11. An image data correction method, comprising:

calculating a distance value from an arbitrary point to a desired point on a screen;

performing correction of image data based on said calculated distance value;

converting a plurality of calculated distance values;

determining correction coefficients for correction of said image data using said converted distance values;

setting correction coefficients corresponding to a predetermined number of said converted distance values to a number of discrete values; and calculating said converted distance values, which are not included in said predetermined converted distance values, by linear interpolation using polygonal lines between said discrete values.

12. The image data correction method according to claim 11, wherein said number of discrete values is at least 32.

13. An image data correction apparatus, comprising:

means for calculating a distance value from an arbitrary point to a desired point on a screen;

means for correcting image data based on said calculated distance value;

means for converting a plurality of calculated distance values according to a number of pixels used to capture an image of said screen; and means for determining correction coefficients of said image data using said converted distance values, wherein correction coefficients corresponding to a predetermined number of said converted distance values which are not included in said predetermined converted distance values are calculated by linear interpolation using polygonal lines between said discrete values.

14. The image data correction apparatus according to claim 13, wherein the number of discrete values is at least 32.

15. An image data correction apparatus, comprising:

means for calculating a distance value from an arbitrary point to a desired point on a screen;

means for correcting image data based on said calculated distance value;

means for converting a plurality of calculated distance values; and means for determining correction coefficients of said image data using said converted distance values, wherein correction coefficients corresponding to a predetermined number of said converted distance values which are not included in said predetermined converted distance values are calculated by linear interpolation using polygonal lines between said discrete values.

16. The image data correction method according to claim 15, wherein the number of discrete values is at least 32.

* * * * *